US011308710B2

(12) United States Patent
Zhu et al.

(10) Patent No.: US 11,308,710 B2
(45) Date of Patent: Apr. 19, 2022

(54) POLYGONAL REGION DETECTION

(71) Applicant: Beijing Sankuai Online Technology Co., Ltd, Beijing (CN)

(72) Inventors: Beier Zhu, Beijing (CN); Rui Zhang, Beijing (CN)

(73) Assignee: Beijing Sankuai Online Technology Co., Ltd, Beijing (CN)

( * ) Notice: Subject to any disclaimer, the term of this patent is extended or adjusted under 35 U.S.C. 154(b) by 4 days.

(21) Appl. No.: 16/768,062

(22) PCT Filed: Oct. 24, 2018

(86) PCT No.: PCT/CN2018/111675
§ 371 (c)(1),
(2) Date: May 28, 2020

(87) PCT Pub. No.: WO2019/148902
PCT Pub. Date: Aug. 8, 2019

(65) Prior Publication Data
US 2020/0356800 A1    Nov. 12, 2020

(30) Foreign Application Priority Data
Feb. 2, 2018 (CN) .......................... 201810108373.9

(51) Int. Cl.
G06V 10/44 (2022.01)
G06T 7/136 (2017.01)
G06T 7/543 (2017.01)

(52) U.S. Cl.
CPC ............ G06V 10/457 (2022.01); G06T 7/136 (2017.01); G06T 7/543 (2017.01)

(58) Field of Classification Search
CPC .... G06K 9/4638; G06K 9/3233; G06T 7/136; G06T 7/543; G06T 2207/10004;
(Continued)

(56) References Cited

U.S. PATENT DOCUMENTS 8,542,207 B1    9/2013  Truta et al.
2017/0206430 A1  7/2017  Abad et al.

FOREIGN PATENT DOCUMENTS

CN    103425984 A     12/2013
CN    104835133 A  *  8/2015 ............... G06T 7/00
(Continued)

OTHER PUBLICATIONS

Yang, E.S. and Kim, G.W., Jun. 2017. Robust quadrilateral detection method for using rectangle feature. In 2017 14th International Conference on Ubiquitous Robots and Ambient Intelligence (URAI) (pp. 349-351). IEEE.*
(Continued)

Primary Examiner — Zhitong Chen
(74) Attorney, Agent, or Firm — Kilpatrick Townsend & Stockton, LLP

(57) ABSTRACT

Various embodiments provide a polygonal region detection method and apparatus, a computer readable storage medium and an electronic device. In those embodiments, a to-be-detected image can be obtained. A plurality of line segments in the image can be calculated based on a line detection algorithm. The plurality of line segments meeting a merging condition can be merged into a line segment. Crosspoints of the pairwise merged line segments can be calculated according to the merged line segments in the image. A polygonal region can be generated with the crosspoints as vertexes of the polygonal region in the image.

18 Claims, 6 Drawing Sheets

(58) Field of Classification Search
CPC ... G06T 2207/20061; G06T 7/12; G06T 7/13; G06T 2207/20068
See application file for complete search history.

(56) References Cited

FOREIGN PATENT DOCUMENTS

| | | | | |
|---|---|---|---|---|
| CN | 104835133 | A | | 8/2015 |
| CN | 104915672 | A | | 9/2015 |
| CN | 105096299 | A | | 11/2015 |
| CN | 105654097 | A | | 6/2016 |
| CN | 105740871 | A | | 7/2016 |
| CN | 106056659 | A | | 10/2016 |
| CN | 106127211 | A | | 11/2016 |
| CN | 106548479 | A | | 3/2017 |
| CN | 106570507 | A | | 4/2017 |
| WO | WO-2016065551 | A | * 5/2016 ........... G06K 9/4604 |

OTHER PUBLICATIONS

State Intellectual Property Office of the People's Republic of China, Office Action and Search Report Issued in Application No. 2018101083739, dated Jan. 14, 2020, 21 pages, (Submitted with Machine Translation).
State Intellectual Property Office of the People's Republic of China, Office Action and Search Report Issued in Application No. 2018101083739, dated Apr. 29, 2020, 27 pages, (Submitted with Machine Translation).
ISA State Intellectual Property Office of the People's Republic of China, Written Opinion of the International Searching Authority Issued in Application No. PCT/CN2018/111675, dated Jan. 28, 2019, WIPO, 7 pages.
ISA State Intellectual Property Office of the People's Republic of China, International Search Report Issued in Application No. PCT/CN2018/111675, dated Jan. 28, 2019, WIPO, 4 pages.
The blog "Principles of RankSVM",Classification: Recommendation System/Model, http://xalgo.cn/index.php/2016/08/09/ranksvm/, Aug. 9, 2016, 11 pages.(Subbmited with English Translation).
The blog "Straight Line Detection in Shape Recognition",By Shenhai Shali, https://blog.csdn.net/liujiabin076/article/details/74917605, Jul. 10, 2017, 32 pages.(Subbmited with English Translation).
State Intellectual Property Office of the People's Republic of China, Office Action and Search Report Issued in Application No. 2018101083739, dated Aug. 12, 2020, 16 pages, (Submitted with Machine Translation).
Sahar Zafari et al, "Comparison of Concave Point Detection Methods for Overlapping Convex Objects Segmentation", ResearchGate, Aug. 29, 2017, 12 pages.
Xianbin Sun et al, "Algorithm for Polygon in Polygon",Journal of Dong Hua University(Natural Science), vol. 33 , No. 3, Jun. 30, 2007, 5 pages.
Lihua Hu et al, "Image Based Automatic Detection Quadrilateral Algorithm", Journal of Chinese Computer Systems, vol. 35, No. 8, Aug. 31, 2014, 6 pages.
Jiangfeng She et al, "A parallelized screen-based method for rendering polylines and polygons on terrain surfaces", Computers & Geosciences vol. 99, journal homepage: www.elsevier.com/locate/cageo, Feb. 28, 2017, 9 pages.
Intellectual property India, Office Action Issued in Application No. 202047019698, dated Jun. 25, 2021, 6 pages.

* cited by examiner

POLYGONAL REGION DETECTION

CROSS-REFERENCE TO RELATED APPLICATION

The present patent application is a National Stage of International Application No. PCT/CN2018/111675 filed on Oct. 24, 2018, which claims priority to Chinese Patent Application No. 201810108373.9 filed on Feb. 2, 2018 and entitled "POLYGONAL REGION DETECTION METHOD AND APPARATUS", the entire contents of which are incorporated herein by reference.

TECHNICAL FIELD

The present disclosure relates to the technical field of Internet, in particular to a polygonal region detection method and apparatus, a computer storage medium and an electronic device.

BACKGROUND

With continuous development of image processing technologies, there are more and more scenes in which polygonal regions in images are detected. For example, in a process of real-name authentication, a user can upload a picture with oneself and an identity card in the same frame, and an authentication system needs to detect a quadrangular region where the identity card in the picture is located, thereby identifying identity card information.

In related technologies, detecting of polygonal regions in an image mainly utilizes a line segment detector (LSD) algorithm. Straight line segments in the image can be calculated through the LSD algorithm, and then the polygonal regions are constructed according to these straight line segments. However, a complete line segment is prone to being broken to become a lot of short line segments due to a large number of interference factors, such as background noise, tiny bending of line segments and line segment intersection, existing in the image. In order to improve processing efficiency, in the prior art, short line segments shorter than a threshold will be deleted. These short line segments are probably a part of sides of the polygonal regions, and therefore, this processing way will affect accuracy of polygonal region detection.

SUMMARY

For this reason, the present application provides a polygonal region detection method and apparatus, a computer storage medium and an electronic device, which are configured to solve the above problem of low accuracy of polygonal region detection.

Various embodiments are implemented by the following technical solution:

According to a first aspect of various embodiments, a polygonal region detection method is provided, and the method includes:

obtaining a to-be-detected image;

calculating line segments in the image based on a line detection algorithm;

merging a plurality of line segments meeting a merging condition into a line segment:

determining crosspoints of the pairwise merged line segments according to the merged line segments in the image; and generating a polygonal region with the crosspoints as vertexes of the polygonal region in the image.

In some embodiments, merging the plurality of line segments meeting the merging condition into a line segment includes:

obtaining any two adjacent line segments:

calculating projection lengths of the two line segments on the same coordinate axis; and merging the two line segments into a line segment when both of vertical distances between two end points of the line segment with the shorter projection length and the other line segment are less than a threshold.

In some embodiments, merging the two line segments into a line segment includes:

obtaining two farthest end points of the two line segments; and connecting the two end points to obtain the merged line segment.

In some embodiments, determining the crosspoints of the pairwise merged line segments according to the merged line segments in the image includes:

setting a direction of each merged line segment clockwise or anticlockwise with a center of the image as an origin to obtain a line segment vector;

obtaining an intersection point between every two line segment vectors; and determining the intersection point to be the crosspoint when the intersection point meets a crosspoint condition.

In some embodiments, generating the polygonal region with the crosspoints as the vertexes of the polygonal region in the image when the polygonal region is a quadrangular region includes:

generating the quadrangular region with the four crosspoints as the vertexes of the quadrangular region in the image when the any four crosspoints meet a condition of generating the quadrangular region.

In some embodiments, the condition of generating the quadrangular region includes:

obtaining a crosspoint A with a coordinate value being greater than 0 and a crosspoint B with a coordinate value being less than 0 under the same coordinate axis with a center point of the image as an origin of coordinates;

obtaining an intersection point C constituted by an incident line segment vector of the crosspoint A and an emergent line segment vector of the crosspoint B:

obtaining an intersection point D constituted by an emergent line segment vector of the crosspoint A and an incident line segment vector of the crosspoint B; and determining that the points A, B, C and D meet the condition of generating the quadrangular region when both of the intersection points C and D meet the crosspoint condition.

The incident line segment vector is a line segment vector pointing to the crosspoint; and the emergent line segment vector is a line segment vector starting from the crosspoint.

In some embodiments, the crosspoint condition include the followings:

the crosspoint of the two line segment vectors is located in the image;

one of the two line segment vectors takes the crosspoint as a terminal point, and the other line segment vector takes the crosspoint as a starting point; and an interior angle constituted by the two line segment vectors meets a set angle range.

In some embodiments, the method further includes:

calculating a duty ratio of each side of the polygonal region, wherein the duty ratio of each side of the polygonal region is a ratio of a solid line length of the side to a length of the side; and deleting the polygonal region when the duty ratio of each side of the polygonal region does not meet a duty ratio condition.

In some embodiments, the duty ratio condition includes at least one of the followings:

a sum of duty ratios of any i sides is greater than an $i^{th}$ preset duty ratio; or a sum of duty ratios of N sides is greater than an $N^{th}$ preset duty ratio.

i is a positive integer of [1,N], and N is the number of sides of a polygonal region. The $i^{th}$ preset duty ratio is greater than an $(i-1)^{th}$ preset duty ratio. The duty ratio is a value greater than 0 and less than or equal to 1.

In some embodiments, the method further includes:

calculating a feature parameter vector of each polygonal region when a plurality of polygonal regions are generated, wherein the feature parameter vector includes at least one feature parameter;

ranking the plurality of polygonal regions according to the feature parameter vector of each polygonal region; and determining the preset number of top ranked polygonal regions as optimal polygonal regions.

In some embodiments, ranking the plurality of polygonal regions according to the feature parameter vector of each polygonal region includes:

calculating a difference value between the feature parameter vectors of every two polygonal regions; and determining a sequence of the two polygonal regions according to a mapping relationship between the difference value and a ranking function.

In some embodiments, each feature parameter further corresponds to a coefficient when there are a plurality of feature parameters in the feature parameter vectors.

In some embodiments, the feature parameter includes at least one of the followings:

a first feature parameter denoting a total duty ratio of all the sides of the polygonal region:

a second feature parameter denoting a sum of ratios of a projection length of each side of the polygonal region in a main direction to an image length in the main direction;

a third feature parameter denoting a similarity degree between interior angles of the polygonal region and interior angles of a regular polygon; or a fourth feature parameter denoting a KL divergence between an internal gray and an external gray of the polygonal region.

According to a second aspect of the embodiments of the present specification, a polygonal region detection apparatus is provided, and the apparatus includes:

an obtaining unit, obtaining a to-be-detected image;

a calculating unit, calculating a plurality of line segments in the image based on a line detection algorithm;

a merging unit, merging the plurality of line segments meeting a merging condition into a line segment;

a determining unit, determining crosspoints of the pairwise merged line segments according to the merged line segments in the image; and a generating unit, generating a polygonal region with the crosspoints as vertexes of the polygonal region.

According to a third aspect of the embodiments of the present specification, a computer readable storage medium is provided. The storage medium stores a computer program. The computer program is configured to perform the polygonal region detection method according to any one of the above embodiments.

According to a fourth aspect of the embodiments of the present specification, an electronic device is provided, including:

a processor; and a memory configured to store an executable instruction of the processor.

The processor is disposed to implement the polygonal region detection method according to any one of the above embodiments.

The embodiments provide a polygonal region detection solution, which can merge a large number of short line segments meeting a merging condition into a line segment. The number of line segments is reduced, and thus subsequent processing efficiency is improved. The short line segments are not deleted, therefore, line segment information in an image is reserved as maximum as possible, which may further effectively improve accuracy of polygonal region detection.

DETAILED DESCRIPTION OF THE EMBODIMENTS

Exemplary embodiments are described in detail herein, and examples of the exemplary embodiments are shown in the accompanying drawings. When the following descriptions relate to the accompanying drawings, unless otherwise indicated, same numbers in different accompanying drawings represent same or similar elements. The following implementations described in the following exemplary embodiments do not represent all implementations that are consistent with the present application. On the contrary, the implementations are merely examples of apparatuses and methods that are described in detail in the appended claims and that are consistent with some aspects of this application.

The terms used herein are merely for the purpose of describing specific embodiments, and are not intended to limit this application. The terms "a", "said" and "the" of singular forms used in this application and the appended claims are also intended to include plural forms, unless otherwise specified in the context clearly. It should also be understood that, the term "and/or" used herein indicates and includes any or all possible combinations of one or more associated listed items.

It should be understood that although the terms such as first, second, and third may be used herein to describe various information, such information should not be limited to these terms. These terms are merely used for distinguishing information of the same type from each other. For example, within the scope of this application, first information may also be referred to as second information, and similarly, second information may also be referred to as first information. Depending on the context, the term "if" as used herein may be interpreted as "when . . . " or "upon . . . " or "in response to determining".

Figure 1:
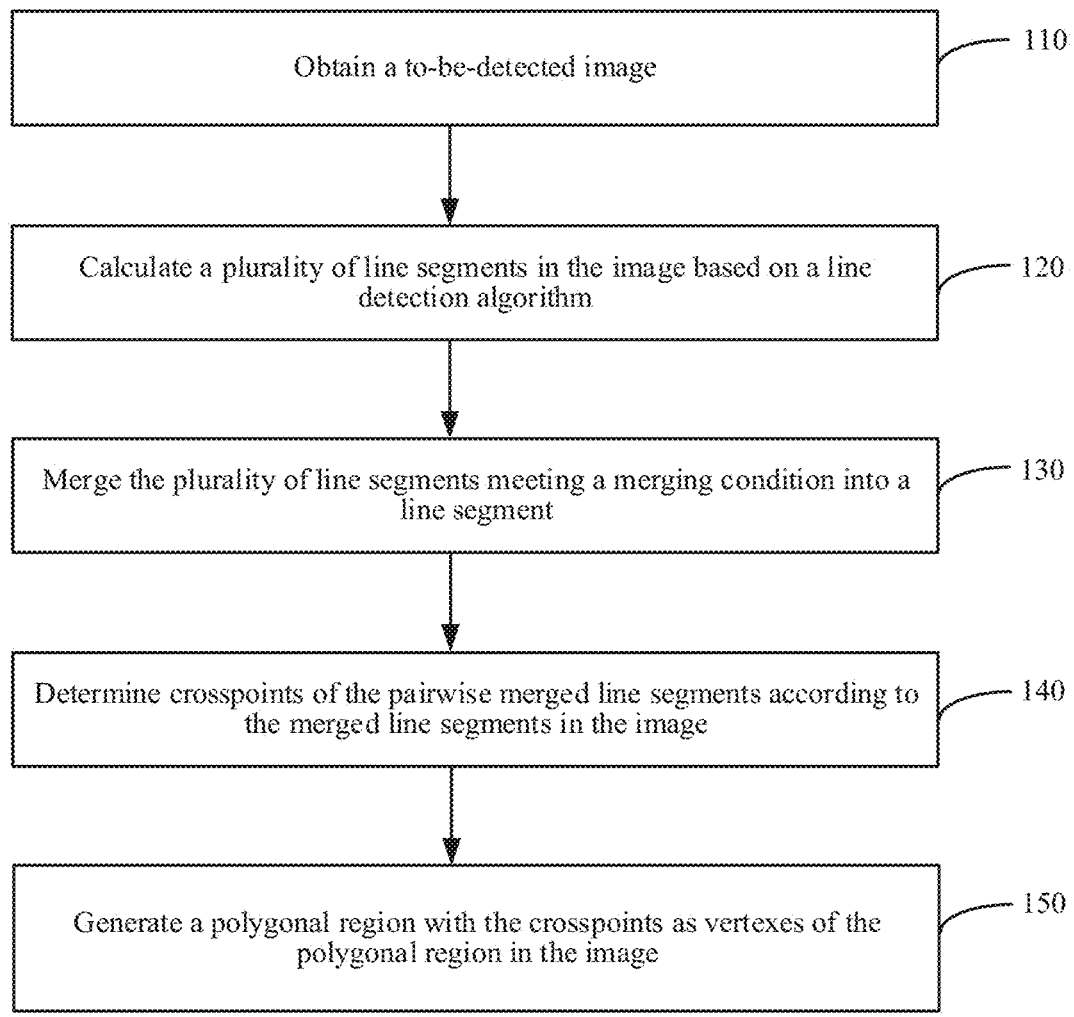
FIG. 1 illustrates a flow diagram of a polygonal region detection method according to an exemplary embodiment of the present application.

FIG. 1 illustrates a flow diagram of a polygonal region detection method according to an exemplary embodiment of the present application. The method may be applied to a polygonal region detection server (server for short below). The method may include the following steps:

Step 110: a to-be-detected image is obtained.

In this embodiment, the server may obtain the to-be-detected image.

Step 120: a plurality of line segments in the image are calculated according to a line detection algorithm.

This embodiment provides the line detection algorithm to be configured to calculate the plurality of line segments in the to-be-detected image. The line segments may generally be straight line segments. The line detection algorithm is a detection method which can quickly detect straight line segments in an image in linear time. The line detection algorithm may include, but is not limited to, an LSD algorithm, a Hough algorithm, etc.

Figure 2:
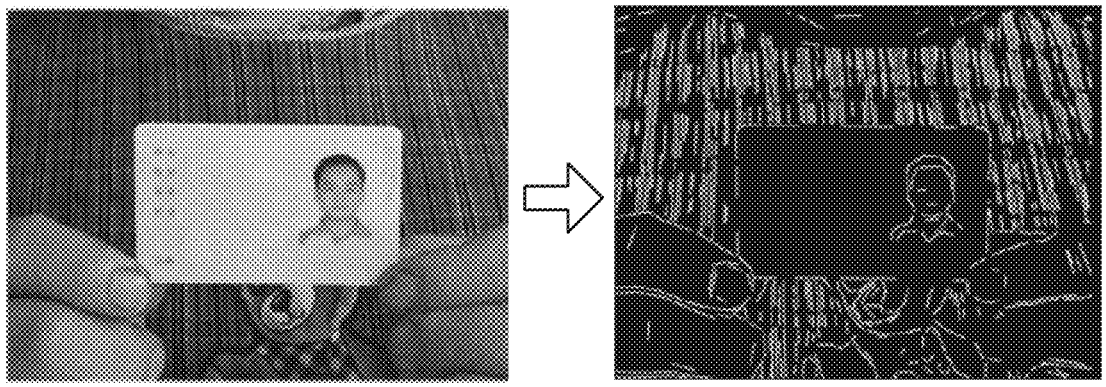
FIG. 2 illustrates schematic diagrams of a to-be-detected image and calculated line segments according to an exemplary embodiment of the present application.

For example, a right part of FIG. 2 shows a schematic diagram of line segments calculated by the line detection algorithm. The example is a picture (a schematic diagram on a left side in FIG. 2) of a hand-held identity card (specific information on the identity card has been hidden in the figure because it involves private information) uploaded by a user under a real-name authentication scene. After obtaining the picture uploaded by the user, the server can calculate the schematic diagram of the line segments shown on the right side in FIG. 2 according to the line detection algorithm. It can be seen that there are very many short line segments in the calculated line segments. The embodiment does not delete the short line segments therein, while merges the short line segments according to step 130 as follows.

Step 130: the plurality of line segments meeting a merging condition are merged into a line segment.

In this embodiment, a line segment merging solution is provided, which can merge a large number of short line segments meeting the merging condition into a line segment. In this way, the number of line segments is reduced, which thus improves subsequent processing efficiency. Furthermore, the short line segments are not deleted, therefore, line segment information in the image is reserved as maximum as possible, and thus polygonal regions in the image can be detected as many as possible.

In an embodiment, step 130 may include:

A1: any two adjacent line segments are obtained.

A2: projection lengths of the two line segments on the same coordinate axis are calculated.

A3: the two line segments are merged into a line segment when both of vertical distances between two end points of the line segment with the shorter projection length in the two line segments and the other line segment in the two line segments are less than a threshold.

A4: merging processing is not made when not both of the vertical distances between both of the two end points of the line segment with the shorter projection length in the two line segments and the other line segment in the two line segments are less than the threshold.

Figure 3:
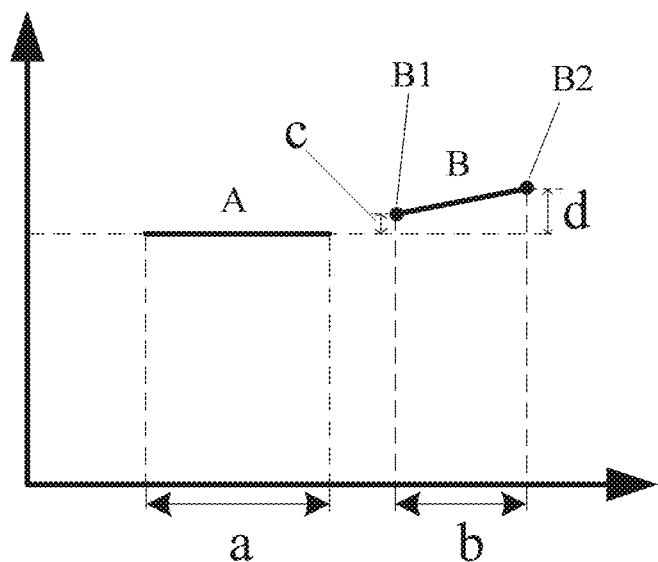
FIG. 3 illustrates a schematic diagram of projection lengths according to an exemplary embodiment of the present application.

The projection length may be a length of a line segment projected on the coordinate axis. Taking a rectangular coordinate system as an example, the coordinate axis may be an abscissa axis (X axis), and may also be an ordinate axis (Y axis), and a used coordinate axis may be preset. As a schematic diagram of projection lengths illustrated in FIG. 3, lengths of line segments A and B with the same length projected on the X axis are respectively a and b. Since a is greater than b, vertical distances between two end points B1 and B2 of the line segment B with the shorter projection length and the line segment A need to be calculated. In some embodiments, the vertical distances may be calculated by using a formula for calculating a distance from a point to a line in analytic geometry. The vertical distance between the end point B1 and the line segment A shown in FIG. 3 is c; and the vertical distance between the end point B2 and the line segment A is d. When both of the vertical distances c and d are less than the threshold, the two line segments A and B can be merged into a line segment.

In another embodiment, step 130 may include:

A5: an angle of each line segment in a polar coordinate system is calculated, and the line segments are ranked from small to large according to angle values.

A6: the first line segment after ranking is determined as an initially merged line segment.

A7: projection lengths of the initially merged line segment and other line segments are calculated.

The step is similar to the above step A2, and the descriptions thereof are omitted herein.

A3: the two line segments are merged into a line segment when both of vertical distances between two end points of the line segment with the shorter projection length and the other line segment are less than a threshold.

In this embodiment, the line segments are ranked through the polar coordinate system, and the first line segment after ranking is used as the initially merged line segment to make the initially merged line segment be sequentially compared with other line segments (performing step A7), so that the line segments meeting the merging condition are merged continuously (performing step A3). When there is no line segment to be capable of being merged with the initially merged line segment, the above steps A5, A6, A7 and A3 are re-performed on the rest of line segments until no line segment can be merged.

In one embodiment, the step A3 may include:

A31: two farthest end points of the two line segments are obtained.

A32: the two end points are connected to obtain a merged line segment.

A33: the two original line segments are deleted.

In some embodiments, a method for calculating the two farthest end points of the two line segments in A31 may be obtaining coordinates of all end points of the two line segments, and finding the end point corresponding to the minimum X-axis coordinate value and the end point corresponding to the maximum X-axis coordinate value therein, wherein the two end points are the farthest end points. The method may also be finding the end point corresponding to the minimum Y-axis coordinate value and the end point corresponding to the maximum Y-axis coordinate value therein, wherein the two end points may also be regarded as the farthest end points. Certainly, a vector distance between any two end points may also be calculated to obtain farthest end points. The present disclosure is not limited to this.

Figure 4:
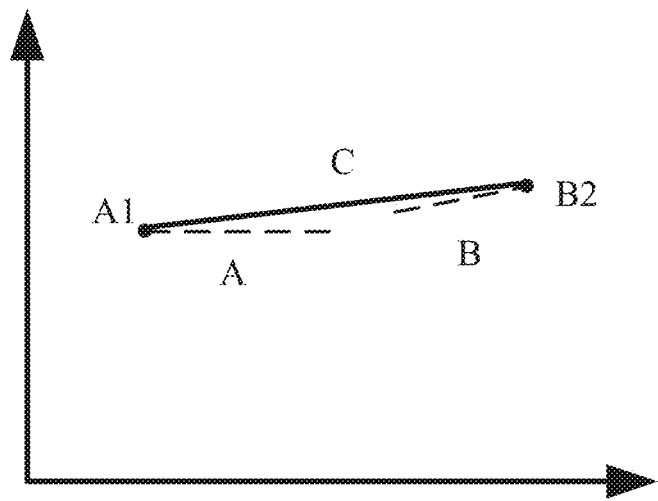
FIG. 4 illustrates a schematic diagram of line segments A and B in FIG. 3 after merging.

FIG. 4 illustrates a schematic diagram of the line segments A and B (denoted by imaginary lines) in FIG. 3 after merging. In the figure, a way for merging the line segments is: connecting two farthest end points, namely A1 and B2 of the line segments A and B to obtain a merged line segment C (denoted by a solid line); and then deleting the original line segments A and B.

Step 140: crosspoints of the pairwise merged line segments are determined according to the merged line segments in the image.

In this embodiment, a solution for determining crosspoints between two line segments is further provided, and configured to calculate to obtain crosspoints configured to construct a polygonal region. In some embodiments, a plurality of line segments may also have the same crosspoint, and at this time, the plurality of line segments may be regarded as a plurality of groups of two line segments crossing at the point. Then analysis is performed according to this method.

In one embodiment, step 140 may include:

B1: a direction of each merged line segment is set clockwise or anticlockwise with a center of the image as an origin to obtain a line segment vector.

B2: an intersection point between the every two line segment vectors is obtained.

B3: the intersection point is determined as the crosspoint when the intersection point meets a crosspoint condition.

Figure 5:
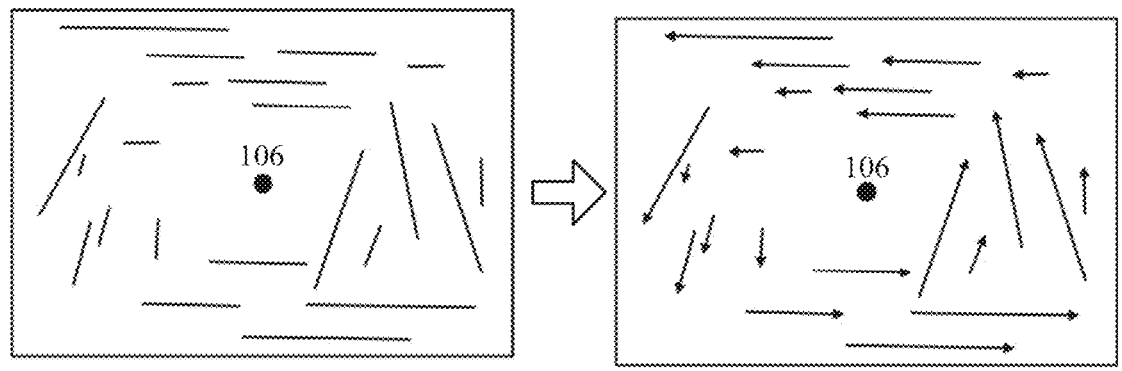
FIG. 5 illustrates a schematic diagram of line segment setting directions according to an exemplary embodiment of the present application.

FIG. 5 illustrates a schematic diagram of line segment setting directions. In FIG. 5, first, an origin 106 of a center of an image is determined, and then directions of all line segments are set anticlockwise to obtain line segment vectors. All the line segment vectors surround the origin 106 in an anticlockwise direction.

In one embodiment, a way for determining the origin may include determining two diagonal lines according to 4 vertexes of the image; and determining an intersection point of the two diagonal lines as the origin.

In an embodiment, the crosspoint condition may include:

(1) a crosspoint of the two line segment vectors is located in the image;

(2) one of the two line segment vectors takes the crosspoint as a terminal point, and the other line segment vector takes the crosspoint as a starting point; and (3) an interior angle constituted by the two line segment vectors meets a set angle range.

In an embodiment, intersection points of line segment vectors may be determined as crosspoints under the situation of meeting all of (1), (2) and (3) in the above crosspoint condition.

Figure 6:
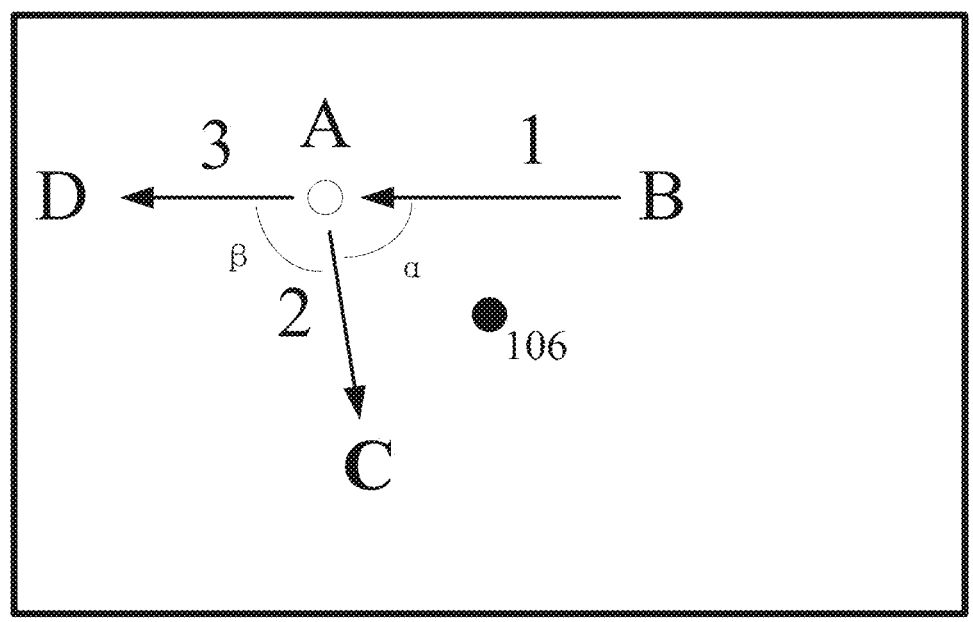
FIG. 6 illustrates a schematic diagram of line segment vector intersection according to an exemplary embodiment of the present application.

FIG. 6 illustrates a schematic diagram of line segment vector intersection. In the figure, line segment vectors 1, 2 and 3 are included. The line segment vectors 1 and 2 are intersected at a point A, and the line segment vectors 2 and 3 are also intersected at the point A. A starting point of the line segment vector 1 is a point B. and a terminal point thereof is the point A. Both of starting points of the line segment vectors 2 and 3 are the point A, and terminal points thereof are respectively points C and D.

Whether the point A is a crosspoint of the line segment vectors 1 and 2 or a crosspoint of the line segment vectors 2 and 3 is described in detail below.

1: For an intersection point A of the line segment vectors 1 and 2:

First, the point A is located in an image, which meets the condition (1).

Second, the line segment vector 1 "$\overrightarrow{BA}$" takes the point A as a terminal point, and the line segment vector 2 "$\overrightarrow{AC}$" takes the point A as a starting point, which meet the condition (2).

Finally, it is assumed that interior angles α of the line segment vectors 1 and 2 are located in a set angle range, which meets the condition (3).

Therefore, the intersection point A of the line segment vectors 1 and 2 may be determined as the crosspoint of the line segment vectors 1 and 2.

2: For an intersection point A of the line segment vectors 2 and 3:

First, the point A is located in an image, which meets the condition (1).

Second, both of the line segment vector 3 "$\overrightarrow{AD}$" and the line segment vector 2 "$\overrightarrow{AC}$" take the point A as a starting point, which does not meet the condition (2).

Even so, it is assumed that interior angles β of the line segment vectors 2 and 3 are located in the set angle range, which meets the condition (3).

Therefore, the intersection point A is not the crosspoint of the line segment vectors 2 and 3 since the condition (2) is not met.

In an embodiment, the angle range may be between 45 degrees and 135 degrees. Certainly, this is merely an example. In actual application, the angle range may be set as a design choice.

Step 150: a polygonal region is generated with the crosspoints as vertexes of the polygonal region in the image.

In actual application, an N-polygon has N vertexes. Therefore, one N-polygon region may be determined according to N crosspoints.

It is further illustrated with a quadrangular region as an example. Step 150 may include: the quadrangular region is generated with four crosspoints as vertexes of the quadrangular region in an image when any four crosspoints meet a condition of generating a quadrangle.

In actual application, one quadrangle may be generated according to 4 points. In this embodiment, a server generates the quadrangular region with the four crosspoints as the vertexes of the quadrangular region in the image when determining that the any four crosspoints meet the condition of generating the quadrangle.

In an embodiment, the condition of generating the quadrangle includes:

a crosspoint A with a coordinate value being greater than 0 and a crosspoint B with a coordinate value being less than 0 under a certain coordinate axis of a coordinate system are respectively obtained with a center point of the image as an origin of the coordinate system;

an intersection point C of an incident line segment vector of the point A and an emergent line segment vector of the point B is obtained:

an intersection point D of an emergent line segment vector of the point A and an incident line segment vector of the point B is obtained; and the points A, B, C and D are determined to meet the condition of generating the quadrangle when both of the intersection points C and D meet a crosspoint condition.

The incident line segment vector of the certain point is a line segment vector pointing to the point, that is, the line segment vector takes the point as a terminal point. The emergent line segment vector of the certain point is a line segment vector starting from the point, that is, the line segment vector takes the point as a starting point.

In the present embodiment, the center point of the image may be assumed as a part of a to-be-detected quadrangular region. Therefore, under the certain coordinate axis of the coordinate system, there must be one vertex with coordinates being greater than 0 and one vertex with coordinates being less than 0 in the to-be-detected quadrangular region. The coordinate axis may select an ordinate axis of the coordinate system, and may also select an abscissa axis of the coordinate system. For example, in a rectangular coordinate system constructed by taking a center point of an image as an origin, there must be one vertex with an ordinate value being greater than 0 and one vertex with an ordinate value being less than 0 in a quadrangle if the center point of the image is located in a quadrangular region.

Figure 7:
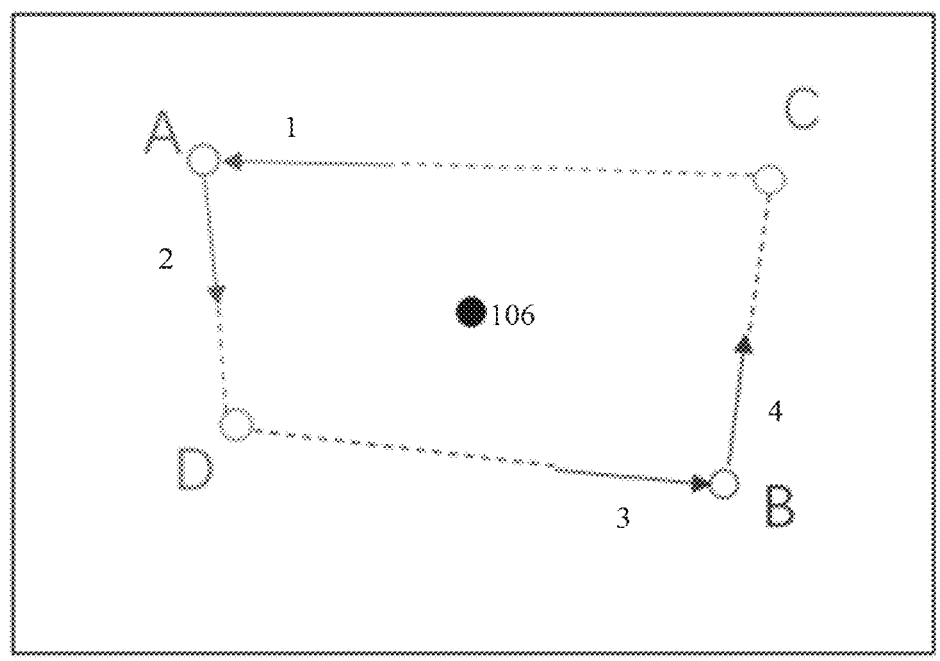
FIG. 7 illustrates a schematic diagram of four intersection points according to an exemplary embodiment of the present application.

For example, FIG. 7 illustrates a schematic diagram of four intersection points. A crosspoint A with an ordinate value being greater than 0 and a crosspoint B with an ordinate value being less than 0 may be obtained with a center point 106 of an image as an origin of coordinates. The crosspoint A corresponds to an incident line segment vector 1 and an emergent line segment vector 2. The crosspoint B corresponds to an incident line segment vector 3 and an emergent line segment vector 4. In FIG. 7, it can be seen that an intersection point of the incident line segment vector 1 of the crosspoint A and the emergent line segment vector 4 of the crosspoint B is a point C; and an intersection point of the emergent line segment vector 2 of the crosspoint A and the incident line segment vector 3 of the crosspoint B is a point D.

Since the intersection point C meets all of (1), (2) and (3) in the above crosspoint condition, the intersection point C is also a crosspoint.

Since the intersection point D meets all of (1), (2) and (3) in the above crosspoint condition, the intersection point D is also a crosspoint.

Based on the foregoing, since both of the points C and D meet the crosspoint condition, the points A, B, C and D may be determined to meet the condition of generating the quadrangle; and the quadrangular region may be generated with the points A, B, C and D as the vertexes of the quadrangular region in the image.

Figure 8:
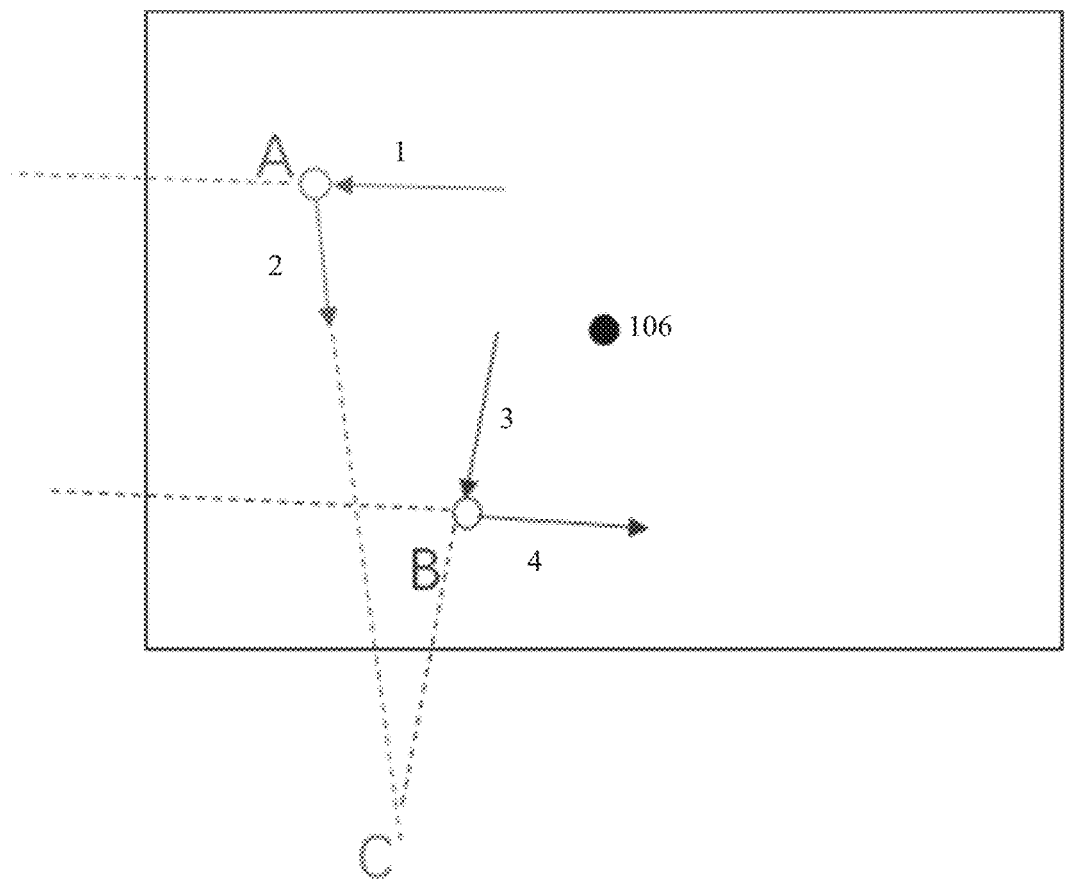
FIG. 8 illustrates a schematic diagram of another four intersection points according to an exemplary embodiment of the present application.

FIG. 8 illustrates a schematic diagram of another four intersection points. Similarly, a crosspoint A with an ordinate value being greater than 0 and a crosspoint B with an ordinate value being less than 0 may be obtained with a center point 106 of an image as an origin of coordinates. The crosspoint A corresponds to an incident line segment vector 1 and an emergent line segment vector 2. The crosspoint B corresponds to an incident line segment vector 3 and an emergent line segment vector 4. In FIG. 8, it can be seen that an intersection point of the incident line segment vector 1 of the crosspoint A and the emergent line segment vector 4 of the crosspoint B is a point D (not shown in the figure); and an intersection point of the emergent line segment vector 2 of the crosspoint A and the incident line segment vector 3 of the crosspoint B is a point C.

Since both of the intersection points C and D exceed an image range, both of the intersection points C and D do not meet the crosspoint condition, that is, the points A, B, C and D do not meet the condition of generating the quadrangle.

This embodiment provides the polygonal region detection solution, which merges the large number of short line segments meeting the merging condition into a line segment. The number of the line segments is reduced, and thus subsequent processing efficiency is improved. The short line segments are not deleted, and therefore, the line segment information in the image is reserved as maximum as possible, which may further improve accuracy of polygonal region detection.

Figure 9:
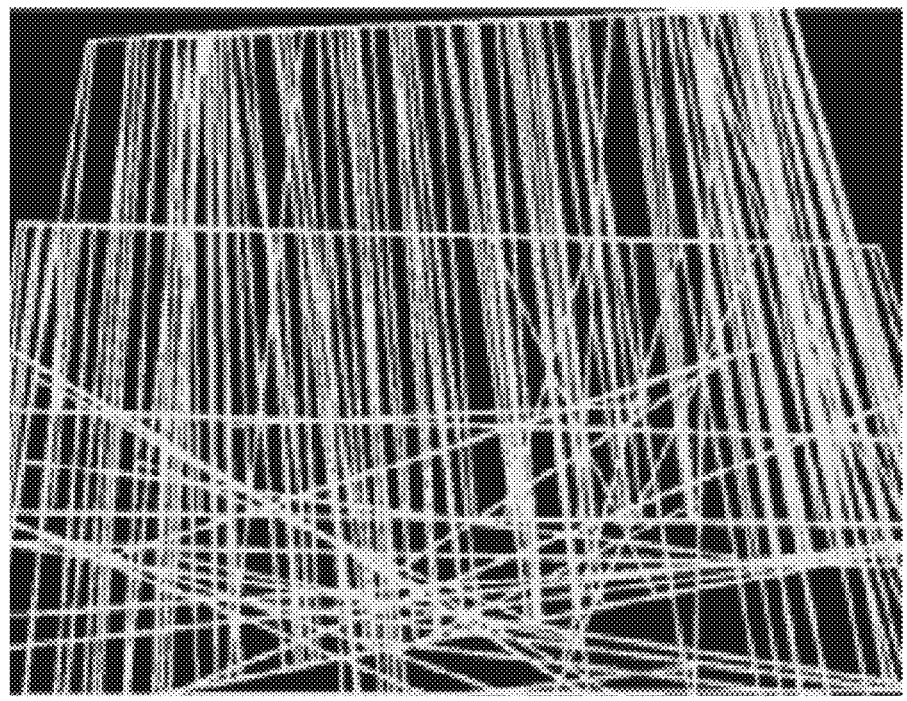
FIG. 9 illustrates a schematic diagram of polygonal regions obtained by detecting the to-be-detected image shown in FIG. 2.

In actual application, the number of detected polygonal regions is large due to the presence of background interference factors of an image. Generally, the more complex an image background is, the larger the number of the detected polygonal regions is. FIG. 9 illustrates a schematic diagram of a polygonal region obtained by detecting the to-be-detected image illustrated in foregoing FIG. 2. It can be seen that there are very many polygonal regions, and optimal polygonal regions need to be screened therefrom.

In order to solve the above problem, based on the embodiment shown in foregoing FIG. 1, the method may further include:

A duty ratio of each side constituting the polygonal region is calculated; moreover, the polygonal region is deleted when the duty ratio of each side of the polygonal region does not meet a duty ratio condition.

The duty ratio reflects a salient degree of edges of the polygonal region. Generally, the higher the duty ratio is, the more salient the edges are, and otherwise, the lower the duty ratio is, the less salient the edges are. Therefore, polygonal regions with edges not salient and obviously unreasonable need to be deleted.

In an embodiment, the duty ratio condition may include at least one of the followings:

a sum of duty ratios of any i sides is greater than an $i^{th}$ preset duty ratio; or a sum of duty ratios of N sides is greater than an $N^{th}$ preset duty ratio.

i is a positive integer of [1,N], and N is the number of sides of a polygonal region. The duty ratio of each side of the polygonal region is a ratio of a solid line length of the side to a length of the side. The $i^{th}$ preset duty ratio is greater than an $(i-1)^{th}$ preset duty ratio. The duty ratio is a value greater than 0 and less than or equal to 1.

The solid line length is a sum of actual lengths of a plurality of line segments before the side is merged in above step 130. Since sides of a polygon may be merged from a plurality of short line segments, a solid line length of each side of the polygon is generally less than or equal to a side length.

It is further illustrated below with a quadrangular region as an example. The duty ratio condition of the quadrangular region may include at least one of the followings:

a duty ratio of any one side is greater than a first preset duty ratio;

a sum of duty ratios of any two sides is greater than a second preset duty ratio;

a sum of duty ratios of any three sides is greater than a third preset duty ratio; or a sum of duty ratios of four sides is greater than a fourth preset duty ratio.

The fourth preset duty ratio is greater than the third preset duty ratio. The third preset duty ratio is greater than the second preset duty ratio. The second preset duty ratio is greater than the first preset duty ratio.

In an example, the duty ratio condition of the quadrangular region are that all the above 4 sub-conditions need to be met. It is assumed that the first preset duty ratio may be 0.125, the second preset duty ratio may be 0.25, the third preset duty ratio may be 0.333, and the fourth preset duty ratio may be 0.45. That is, this quadrangular region may be reserved only under the situation of meeting all the 4 sub-conditions that the duty ratio of any one side of the quadrangular region is greater than 0.125, the sum of the duty ratios of any two sides is greater than 0.25, the sum of the duty ratios of any three sides is greater than 0.333, as well as the sum of the duty ratios of four sides is greater than 0.45. However, this quadrangular region will be deleted under the situation of not meeting any one condition.

In an embodiment, any one sub-condition of the above duty ratio condition may be selected as a screening condition. In another embodiment, multiple sub-conditions of the above duty ratio condition may be selected as a screening condition. For example, a quadrangle is only reserved when meeting the above 4 sub-conditions. Or, the quadrangle may be reserved as long as meeting the above first sub-condition. In general, the more duty ratio sub-conditions need to be met, the more quadrangles will be deleted. The present disclosure does not limit selection of the duty ratio condition.

Through the present embodiment, a server may screen polygonal regions obtained by detection once to delete some unreasonable polygonal regions.

There could be a plurality of detected polygonal regions, while polygonal regions actually needed by the server are generally the optimal one or multiple thereof, and therefore, optimal polygonal regions further need to be selected from the plurality of detected polygonal regions. Therefore, based on the embodiment shown in foregoing FIG. 1, the method may further include:

C1: a feature parameter vector of each polygonal region is calculated when a plurality of polygonal regions are generated, wherein the feature parameter vector includes at least one feature parameter;

C2: the plurality of polygonal regions are ranked according to the feature parameter vectors of the polygonal regions; and C3: the preset number of top ranked polygonal regions is determined as the optimal polygonal regions.

In an embodiment, the step C2: the plurality of polygonal regions are ranked according to the feature parameter vectors of the polygonal regions, may include: a difference value between feature parameter vectors of two polygonal regions is calculated; and a sequence of the two polygonal regions is determined according to a mapping relationship between the difference value and a ranking function.

For example, a sequence of a polygonal region A may be determined to be higher than that of a polygonal region B when a difference value between a feature parameter vector of the polygonal region A and a feature parameter vector of the polygonal region B is greater than 0. The sequence of the polygonal region A may be determined to be lower than that of the polygonal region B when the difference value between the feature parameter vector of the polygonal region A and the feature parameter vector of the polygonal region B is less than 0.

In an embodiment, a law or relation between the feature parameters of the polygonal regions and ranking results may be found by setting reasonable functions in combination with existing machine learning technologies. For example, a ranking support vector machine (RankSVM) may be adopted as a ranking function, model training is performed through manually marked training sample sets (such as 100 images as well as corresponding polygonal regions, a feature parameter vector of each polygonal region, and ranking results of different polygonal regions), and thus coefficients needed by a model are obtained. When the feature parameter vector includes a plurality of feature parameters, each feature parameter further corresponds to a coefficient, and values of these coefficients may be obtained by the model training. The RankSVM is suitable for solving a ranking problem. A training sample i may include feature parameter vectors $x_i^1$, $x_i^2$ of two polygonal regions, and a ranking result $y_i$. For example, when $x_i^1$ is higher than $x_i^2$ in order, a ranking result being 1 may be output, otherwise, −1 is output.

In an embodiment, a model is essentially a formula. The above trained model may be a formula (1):

$$y = \langle x^1 - x^2 \rangle \tag{1}$$

wherein $x^1$, $x^2$ are respectively feature parameter vectors of two polygonal regions. When y>0, it is denoted that $x^1$ is higher than $x^2$ in order. When y<0, it is denoted that $x^2$ is higher than $x^1$ in order, and $\langle \rangle$ denotes any ranking function.

In an embodiment, $\langle \rangle$ may be any function. It may be assumed to be a linear function for the sake of simplicity. Correspondingly, the above trained model may be a formula (2):

$$y = \langle x^1 - x^2, \omega \rangle \tag{2}$$

wherein $\omega$ is a weight coefficient of a feature parameter vector, and the weight coefficient may be obtained by applying formulas (3) to (6) to train training sample sets:

$$\min_{\omega, \xi} \frac{1}{2}\|\omega\|^2 + C\Sigma_{i=1}^{N} \xi_i \tag{3}$$

$$s.t \ y_i \langle x_i^1 - x_i^2, \omega \rangle \geq 1 - \xi_i \tag{4}$$

$$\xi_i \geq 0 \tag{5}$$

$$i = 1, \ldots, N \tag{6}$$

Wherein $x_i^1, x_i^2$ are feature parameter vectors of two polygonal regions in an $i^{th}$ training sample. $y_i$>0 denotes that $x_i^1$ is higher than $x_i^2$ in order, $y_i$<0 denotes that $x_i^1$ is lower than $x_i^2$ in order, and $\xi$ is a slack variable. $\|\bullet\|$ denotes an L2 norm. N denotes the number of training samples. C>0 is a penalty coefficient. i denotes a serial number of a training sample.

The formula (3) is an optimal object of a model, wherein $\omega$, $\xi$ need to meet the formulas (4) to (6).

The feature parameter vector includes at least one of the following feature parameters:

a first feature parameter, denoting a total duty ratio of all sides of a polygon;

a second feature parameter, denoting a sum of ratios of a projection length of each side of the polygon in a main direction to an image length in the main direction;

a third feature parameter, denoting a similarity degree between interior angles of the polygon and interior angles of a regular polygon; or a fourth feature parameter, denoting a Kullback-Leibler (KL) divergence between an internal gray and an external gray of the polygon.

For the sake of simplicity, calculation of the feature parameters is illustrated below with a quadrangle as an example. In an embodiment, the first feature parameter may be configured to indicate a salient degree of edges of the quadrangle, and the total duty ratio may be calculated according to a formula (7):

$$\sum_{i=1}^{4} \frac{\text{a solid line length of an } i^{th} \text{ side}}{\text{an } i^{th} \text{ side length}}, \quad (7)$$

wherein the solid line length is a sum of actual lengths of a plurality of line segments before the side is merged. Since sides of the quadrangle may be merged from a plurality of short line segments, a solid line length of each side of the quadrangle is generally less than or equal to a side length.

In an embodiment, the second feature parameter may be calculated according to a formula (8):

$$\sum_{i=1}^{4} \frac{\text{a projection length of an } i^{th} \text{ side in a main direction thereof}}{\text{a corresponding image length of an } i^{th} \text{ side in a main direction}}, \quad (8)$$

wherein the main direction is a direction of a relatively long projection length of the side lengths projected onto an X axis or a Y axis. Each side of the quadrangle has a main direction (an X-axis direction or a Y-axis direction). Generally, an image length corresponding to the X-axis direction is a width of an image, and an image length corresponding to the Y-axis direction is a height of the image.

In an embodiment, the third feature parameter may be calculated according to a formula (9):

$$\sum_{i=1}^{4} \frac{|\text{an angle of an } i^{th} \text{ interior angle} - 90|}{90}. \quad (9)$$

The feature parameter is configured to denote a similarity degree between the quadrangle and a rectangle.

In an embodiment, the fourth feature parameter, namely the KL divergence may be calculated according to a formula (10):

$$D_{KL}(p\|q) = \frac{1}{2}\sum_{x}\left(p(x)\log\frac{p(x)}{q(x)} + q(x)\log\frac{q(x)}{p(x)}\right), \quad (10)$$

wherein p denotes a color value frequency distribution inside the quadrangle. q denotes a color value frequency distribution outside the quadrangle. x denotes a distribution factor of a color value frequency distribution. $D_{KL}(p\|q)$ denotes a KL divergence of the internal frequency distribution p to the external frequency distribution q. The color value frequency distribution may be an RGB color value frequency distribution, and may also be a gray value frequency distribution. Taking the gray value frequency distribution as an example, x is 0, 1, 2, ..., 255 when a gray value of the image is 0 to 255, and the gray value frequency distributions p and q are the numbers of pixels taking each gray value. The KL divergence may be regarded as a dissimilarity degree between the frequency distributions p and q. The KL divergence is 0 when the two frequency distributions are the same. The KL divergence also increases when a difference between the two frequency distributions increases.

It is assumed that there are 3 quadrangular regions in an image, namely the innermost quadrangular region 1, the middle quadrangular region 2 and the outermost quadrangular region 3, wherein a gray value frequency distribution inside the quadrangular region 1 is p, a gray value frequency distribution between the quadrangular regions 1 and 2 is q, and a gray value frequency distribution between the quadrangular regions 2 and 3 is r. KL divergences among the quadrangular regions 1, 2 and 3 are calculated to obtain:

The KL divergence of the quadrangular region 1 to the quadrangular region 2: $D_{KL}(p\|q)$;

The KL divergence of the quadrangular region 2 to the quadrangular region 3: $D_{KL}(q\|r)$; and The KL divergence of the quadrangular region 1 to the quadrangular region 3: $D_{KL}(p\|r)$.

In an embodiment, a plurality of detected polygonal regions may be ranked based on a trained model. Ranking results may be obtained only by inputting feature parameter vectors of the plurality of polygonal regions into the model. Moreover, the model may further be trained with these ranking results as a new training sample, thus better coefficients are obtained continuously, and model ranking accuracy is improved continuously.

In an embodiment, a server may determine the preset number of top ranked polygonal regions to be optimal polygonal regions after ranking the polygonal regions.

In an embodiment, the preset number may be set according to demands. For example, the preset number may be set to be 1 if one optimal polygonal region merely needs to be determined, the preset number may be set to be 10 if 10 optimal polygonal regions are needed, and so on.

Figure 10:
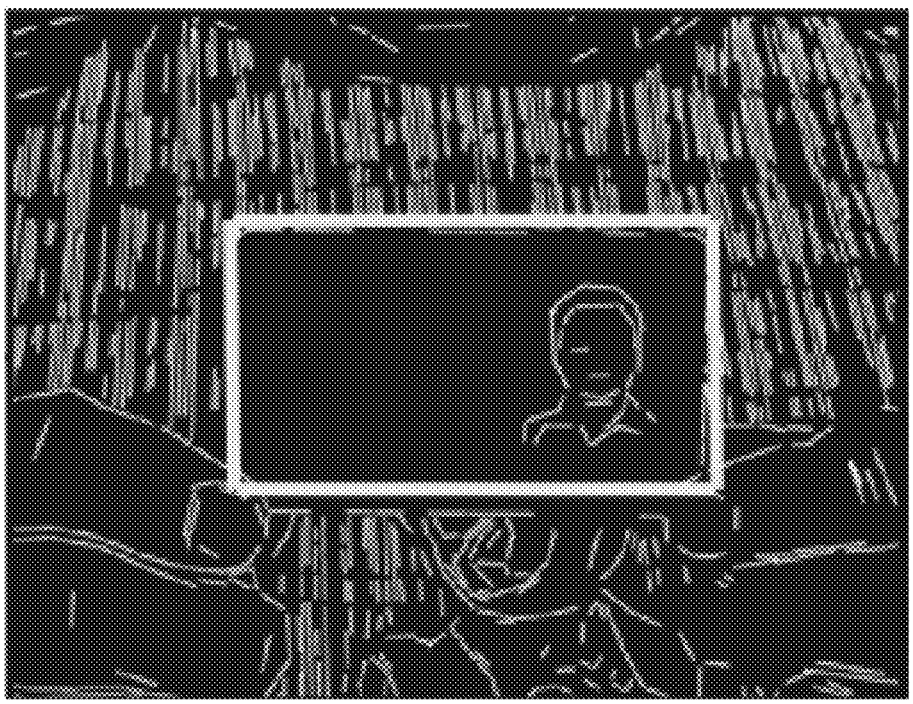
FIG. 10 illustrates a schematic diagram of a finally-determined polygonal region first in order after the to-be-detected image shown in FIG. 2 is processed.

FIG. 10 illustrates a schematic diagram of a finally-determined polygonal region first in order after the to-be-detected image illustrated in FIG. 2 is processed above.

The embodiment not only considers color indexes (the fourth feature parameter) of the edges of the polygonal regions, but also considers salient degrees (the first feature parameter) of the edges of the polygonal regions, shapes (the second feature parameter and the third feature parameter) of the polygonal regions, etc. when screening the polygonal regions, thereby making accuracy of optimized polygonal regions higher. Although the polygonal regions may be ranked according to a feature parameter vector constituted by a certain feature parameter, better results may be obtained by using the feature parameter vector constituted by the above four feature parameters to rank the polygonal regions.

Corresponding to the embodiments of the foregoing polygonal region detection method, the present application further provides an embodiment of a polygonal region detection apparatus.

Figure 11:
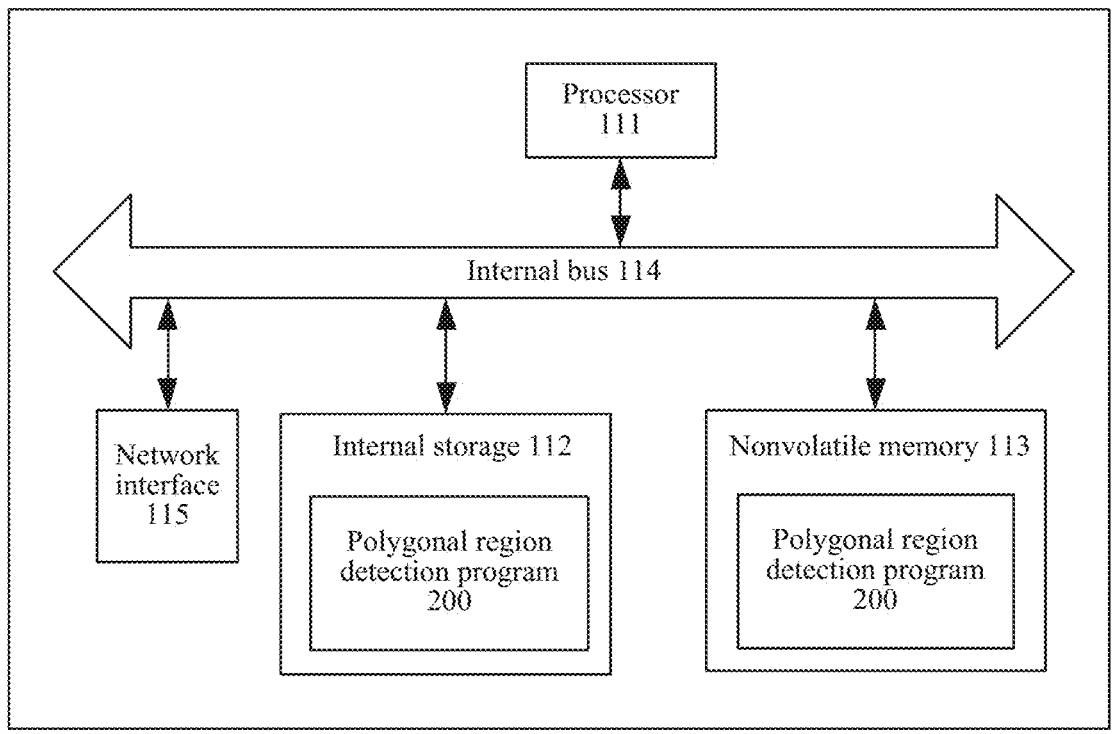
FIG. 11 illustrates a structural diagram of hardware of a polygonal region detection apparatus according to an exemplary embodiment of the present application.

The polygonal region detection apparatus according to the embodiment may be applied to a server. The apparatus embodiment may be implemented by software, and may also be implemented by hardware or in a way of combination of software and hardware. Taking software implementation as an example, the apparatus, as a logical apparatus, is formed by reading a corresponding computer program instruction in a nonvolatile memory into an internal storage for operation by a processor therein. From an aspect of the hardware, FIG. 11 illustrates a structural diagram of hardware where the polygonal region detection apparatus is located, which includes a processor 111, an internal bus 114, a network interface 115, an internal storage 112 and a nonvolatile memory 113. The processor 111 reads a corresponding polygonal region detection program 200 from the nonvolatile memory 113 into the internal storage 112 and then operates the program. In addition to the processor 111, the internal storage 112, the network interface 115, the internal bus 114 and the nonvolatile memory 113 illustrated in FIG. 11, other hardware may further be generally included in the embodiment according to actual functions of the polygonal region detection, and the descriptions thereof are omitted.

Figure 12:
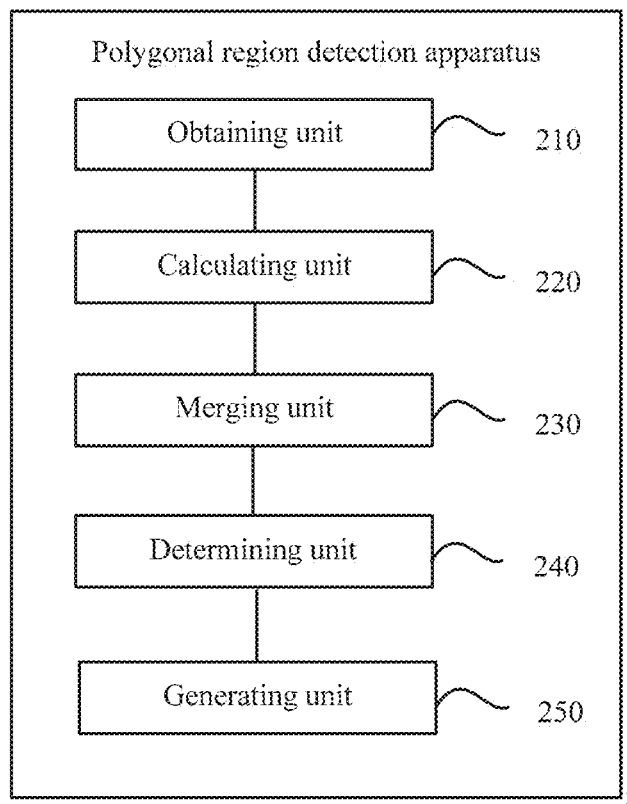
FIG. 12 illustrates a schematic diagram of modules of a polygonal region detection apparatus according to an exemplary embodiment of the present application.

Referring to FIG. 12, in a software implementation, the polygonal region detection apparatus may include:

an obtaining unit 210, obtaining a to-be-detected image;

a calculating unit 220, calculating a plurality of line segments in the image based on a line detection algorithm:

a merging unit 230, merging the plurality of line segments meeting a merging condition into a line segment;

a determining unit 240, determining crosspoints of the pairwise merged line segments according to the merged line segments in the image; and a generating unit 250, generating a polygonal region with the crosspoints as vertexes of the polygonal region in the image.

In some embodiments, the merging unit 230 includes:

a first obtaining subunit, obtaining any two adjacent line segments:

a first calculating subunit, calculating projection lengths of the two line segments on the same coordinate axis; and a merging subunit, merging the two line segments into a line segment when both of vertical distances between two end points of the line segment with the shorter projection length and the other line segment are less than a threshold.

In some embodiments, the merging subunit includes:

a second obtaining subunit, obtaining two farthest end points of the two line segments; and a connecting subunit, connecting the two end points to obtain a merged line segment.

In some embodiments, the determining unit 240 includes:

a setting subunit, setting a direction of each merged line segment clockwise or anticlockwise with a center of the image as an origin to obtain a line segment vector;

a third obtaining subunit, obtaining an intersection point between the every two line segment vectors; and a second calculating subunit, determining the intersection point as a crosspoint when the intersection point meets a crosspoint condition.

In some embodiments, when the polygonal region is a quadrangular region, the generating unit 250 includes:

a generating subunit, generating the quadrangular region with four crosspoints as vertexes of the quadrangular region in the image when any four crosspoints meet a condition of generating the quadrangular region.

In some embodiments, the condition of generating the quadrangular region include:

a crosspoint A with a coordinate value being greater than 0 and a crosspoint B with a coordinate value being less than 0 under the same coordinate axis are obtained with a center point of the image as an origin of coordinates;

an intersection point C constituted by an incident line segment vector of the crosspoint A and an emergent line segment vector of the crosspoint B is obtained;

an intersection point D constituted by an emergent line segment vector of the crosspoint A and an incident line segment vector of the crosspoint B is obtained; and the points A, B, C and D are determined to meet the condition of generating the quadrangular region when both of the intersection points C and D meet the crosspoint condition.

The incident line segment vector is a line segment vector pointing to the crosspoint; and the emergent line segment vector is a line segment vector starting from the crosspoint.

In some embodiments, the crosspoint condition includes the followings:

the crosspoint of the two line segment vectors is located in the image;

one of the two line segment vectors takes the crosspoint as a terminal point, and the other of the two line segment vectors takes the crosspoint as a starting point; and an interior angle constituted by the two line segment vectors meets a set angle range.

In some embodiments, the apparatus further includes:

a third calculating unit, calculating a duty ratio of each side of the polygonal region, wherein the duty ratio of each side of the polygonal region is a ratio of a solid line length of the side to a length of the side; and a deleting unit, deleting the polygonal region when the duty ratio of each side of the polygonal region does not meet a duty ratio condition.

In some embodiments, the duty ratio condition includes at least one of the followings:

a sum of duty ratios of any i sides is greater than an $i^{th}$ preset duty ratio; or a sum of duty ratios of N sides is greater than an $N^{th}$ preset duty ratio.

i is a positive integer of [1,N], and N is the number of sides of a polygonal region; the $i^{th}$ preset duty ratio is greater than an $(i-1)^{th}$ preset duty ratio; and the duty ratio is a value greater than 0 and less than or equal to 1.

In some embodiments, the apparatus further includes:

a fourth calculating subunit, calculating a feature parameter vector of each polygonal region when a plurality of polygonal regions are generated, wherein the feature parameter vector includes at least one feature parameter:

a ranking subunit, ranking the plurality of polygonal regions according to the feature parameter vector of each polygonal region; and a determining subunit, determining the preset number of top ranked polygonal regions as optimal polygonal regions.

In some embodiments, the ranking subunit includes:

a fifth calculating subunit, calculating a difference value between the feature parameter vectors of the two polygonal regions; and a second determining subunit, determining a sequence of the two polygonal regions according to a mapping relationship between the difference value and a ranking function.

In some embodiments, each feature parameter further corresponds to a coefficient when there are a plurality of feature parameters in the feature parameter vector.

In some embodiments, the feature parameter includes at least one of the followings:

a first feature parameter, denoting a total duty ratio of all sides of the polygonal region;

a second feature parameter, denoting a sum of ratios of a projection length of each side of the polygonal region in a main direction to an image length in the main direction:

a third feature parameter, denoting a similarity degree between interior angles of the polygonal region and interior angles of a regular polygon; or a fourth feature parameter, denoting a KL divergence between an internal gray and an external gray of the polygonal region.

The implementation process of functions and effects of each unit in the above apparatus is specified in detail in the implementation process of corresponding steps in the above method, and the descriptions thereof are omitted herein.

For the apparatus embodiment, it basically corresponds to the method embodiments, and therefore, related descriptions refer to parts of descriptions of the method embodiments. The above described apparatus embodiment is merely schematic, wherein the units illustrated as separated components may be or may not be physically separated, and components displayed as units may be or may not be physical units, that is, may be located at the same place, or may also be distributed onto a plurality of network units. Parts or all of modules therein may be selected according to actual needs to implement the objective of the solution of the present application. Those of ordinary skill in the art may understand and implement without paying inventive labor.

Above FIG. 12 describes internal functional modules and a structural schema of a business monitoring apparatus, and an actual executive body thereof may be an electronic device, including:

a processor; and a memory configured to store an executable instruction of the processor.

The processor is disposed to:

obtain a to-be-detected image;

calculate a plurality of line segments in the image based on a line detection algorithm;

merge the plurality of line segments meeting merging a condition into a line segment;

determine crosspoints between the merged line segments according to the merged line segments; and generate a polygonal region with the crosspoints as vertexes of the polygonal region in the image.

In some embodiments, merging the plurality of line segments meeting the merging condition into a line segment includes:

any two adjacent line segments are obtained;

projection lengths of the two line segments on the same coordinate axis are calculated; and the two line segments are merged into a line segment when both of vertical distances between two end points of the line segment with the shorter projection length and the other line segment are less than a threshold.

In some embodiments, merging the two line segments into a line segment includes:

two farthest end points of the two line segments are obtained; and the two end points are connected to obtain a merged line segment.

In some embodiments, determining the crosspoints of the pairwise merged line segments according to the merged line segments in the image includes:

a direction of each merged line segment is set clockwise or anticlockwise with a center of the image as an origin to obtain a line segment vector:

an intersection point between the every two line segment vectors is obtained; and the intersection point is determined as the crosspoint when the intersection point meets a crosspoint condition.

In some embodiments, generating the polygonal region with the crosspoints as the vertexes of the polygonal region in the image when the polygonal region is a quadrangular region includes:

the quadrangular region is generated with four crosspoints as vertexes of the quadrangular region in the image when any four crosspoints meet a condition of generating the quadrangular region.

In some embodiments, the condition of generating the quadrangular region includes:

a crosspoint A with a coordinate value being greater than 0 and a crosspoint B with a coordinate value being less than 0 under the same coordinate axis are obtained with a center point of the image as an origin of coordinates;

an intersection point C constituted by an incident line segment vector of the crosspoint A and an emergent line segment vector of the crosspoint B is obtained:

an intersection point D constituted by an emergent line segment vector of the crosspoint A and an incident line segment vector of the crosspoint B is obtained; and the points A, B, C and D are determined to meet the condition of generating the quadrangular region when both of the intersection points C and D meet the crosspoint condition.

The incident line segment vector is a line segment vector pointing to the crosspoint; and the emergent line segment vector is a line segment vector starting from the crosspoint.

In some embodiments, the crosspoint condition includes the followings:

the crosspoint of the two line segment vectors is located in the image;

one of the two line segment vectors takes the crosspoint as a terminal point, and the other of the two line segment vectors takes the crosspoint as a starting point; and an interior angle constituted by the two line segment vectors meets a set angle range.

In some embodiments, further including:

a duty ratio of each side of the polygonal region is calculated, wherein the duty ratio of each side of the polygonal region is a ratio of a solid line length of the side to a length of the side; and the polygonal region is deleted when the duty ratio of each side of the polygonal region does not meet a duty ratio condition.

In some embodiments, the duty ratio condition includes at least one of the followings:

a sum of duty ratios of any i sides is greater than an $i^{th}$ preset duty ratio; or a sum of duty ratios of N sides is greater than an $N^{th}$ preset duty ratio.

i is a positive integer of [1,N], and N is the number of sides of a polygonal region; the $i^{th}$ preset duty ratio is greater than an $(i-1)^{th}$ preset duty ratio; and the duty ratio is a value greater than 0 and less than or equal to 1.

In some embodiments, further including:

a feature parameter vector of each polygonal region is calculated when a plurality of polygonal regions are generated, wherein the feature parameter vector includes at least one feature parameter;

the plurality of polygonal regions are ranked according to the feature parameter vector of each polygonal region; and the preset number of top ranked polygonal regions is determined as optimal polygonal regions.

In some embodiments, ranking the plurality of polygonal regions according to the feature parameter vector of each polygonal region includes:

a difference value between the feature parameter vectors of the two polygonal regions is calculated; and a sequence of the two polygonal regions is determined according to a mapping relationship between the difference value and a ranking function.

In some embodiments, each feature parameter further corresponds to a coefficient when there are a plurality of feature parameters in the feature parameter vector.

In some embodiments, the feature parameter includes at least one of the followings:

a first feature parameter, denoting a total duty ratio of all sides of the polygonal region;

a second feature parameter, denoting a sum of ratios of a projection length of each side of the polygonal region in a main direction to an image length in the main direction;

a third feature parameter, denoting a similarity degree between interior angles of the polygonal region and interior angles of a regular polygon; or a fourth feature parameter, denoting a KL divergence between an internal gray and an external gray of the polygonal region.

In the foregoing embodiments of the electronic device, it should be understood that, the processor may be a central processing unit (CPU), or another general purpose processor, a digital signal processor (DSP), an application specific integrated circuit (ASIC), or the like. The general purpose processor may be a micro-processor, or any conventional processor, or the like. The foregoing memory may be a read-only memory (ROM), a random access memory (RAM), a flash memory, a hard disk, or a solid-state disk. The steps of the methods disclosed in the embodiments of the present invention may be directly embodied as being executed by a hardware processor, or by a combination of hardware in a processor and software modules.

The embodiments herein are all described in a progressive manner, for same or similar parts in the embodiments, refer to these embodiments, and descriptions of each embodiment focus on a difference from other embodiments. Especially, an electronic device embodiment is basically similar to a method embodiment, and therefore is described briefly; for related parts, reference may be made to partial descriptions in the method embodiment.

The foregoing descriptions are merely exemplary embodiments, but are not intended to limit this application. Any modification, equivalent replacement, or improvement made without departing from the spirit and principle in accordance with the present disclosure should fall within the protection scope in accordance with the present disclosure.

The invention claimed is:

1. A polygonal region detection method, comprising:
   obtaining, by at least one processor, a to-be-detected image;
   calculating, by the at least one processor, line segments in the image based on a line detection algorithm;
   merging, by the at least one processor, a plurality of line segments meeting a merging condition into a merged line segment;
   determining, by the at least one processor, crosspoints of pairwise merged line segments according to the merged line segment; and
   generating, by the at least one processor, a polygonal region with the crosspoints as vertexes of the polygonal region in the image;
   wherein merging the plurality of line segments meeting the merging condition into the merged line segment comprises:
   obtaining, by the at least one processor, any two adjacent line segments;
   calculating, by the at least one processor, projection lengths of the two line segments on the same coordinate axis; and
   merging, by the at least one processor, the two line segments into a merged line segment when both of vertical distances between two end points of the line segment with the shorter projection length and the other line segment are less than a threshold.

2. The method according to claim 1, wherein merging the two line segments into the line segment comprises:
   obtaining, by the at least one processor, two farthest end points of the two line segments; and
   connecting, by the at least one processor, the two end points to obtain a merged line segment.

3. The method according to claim 1, wherein determining the crosspoints of the pairwise merged line segments according to the merged line segments in the image comprises:
   setting, by the at least one processor, a direction of each merged line segment clockwise or counter clockwise with a center of the image as an origin to obtain a line segment vector;
   obtaining, by the at least one processor, an intersection point between every two line segment vectors; and
   determining, by the at least one processor, the intersection point as the crosspoint when the intersection point meets a crosspoint condition.

4. The method according to claim 3, wherein the crosspoint condition comprises the followings:
   the crosspoint of the two line segment vectors is located in the image;
   one of the two line segment vectors takes the crosspoint as a terminal point, and the other of the line segment vectors takes the crosspoint as a starting point; and
   an interior angle constituted by the two line segment vectors meets a set angle range.

5. The method according to claim 1, wherein generating the polygonal region with the crosspoints as the vertexes of the polygonal region in the image comprises:
   generating, by the at least one processor, the quadrangular region with four crosspoints as the vertexes of the quadrangular region in the image when any four crosspoints meet a condition of generating the quadrangular region.

6. The method according to claim 5, wherein the condition of generating the quadrangular region comprises:
   obtaining, by the at least one processor, a crosspoint A with a coordinate value being greater than 0 and a crosspoint B with a coordinate value being less than 0 under the same coordinate axis with a center point of the image as an origin of coordinates;
   obtaining, by the at least one processor, an intersection point C constituted by an incident line segment vector of the crosspoint A and an emergent line segment vector of the crosspoint B;
   obtaining, by the at least one processor, an intersection point D constituted by an emergent line segment vector of the crosspoint A and an incident line segment vector of the crosspoint B; and
   determining, by the at least one processor, the points A, B, C and D to meet the condition of generating the quadrangular region when both of the intersection points C and D meet a crosspoint condition; and, wherein
   the incident line segment vector is a line segment vector pointing to the crosspoint; and the emergent line segment vector is a line segment vector starting from the crosspoint.

7. The method according to claim 1, wherein the method further comprises:

calculating, by the at least one processor, a duty ratio of each side of the polygonal region, wherein the duty ratio of each side of the polygonal region is a ratio of a solid line length of the side to a length of the side; and deleting, by the at least one processor, the polygonal region when the duty ratio of each side of the polygonal region does not meet a duty ratio condition.

8. The method according to claim 7, wherein the duty ratio condition comprises at least one of the followings:

a sum of duty ratios of any i number of sides is greater than an ith preset duty ratio; or a sum of duty ratios of N number of sides is greater than an Nth preset duty ratio, wherein N is an integer greater than 1; and, wherein i is a positive integer of [1N], and N is the number of sides of the polygonal region;

the ith preset duty ratio is greater than an (i−1)th preset duty ratio; and the duty ratio is a value greater than 0 and less than or equal to 1.

9. The method according to claim 1, wherein the method further comprises:

calculating, by the at least one processor, a feature parameter vector of each polygonal region when a plurality of polygonal regions are generated, wherein the feature parameter vector comprises at least one feature parameter;

ranking, by the at least one processor, the plurality of polygonal regions according to the feature parameter vector of each polygonal region; and determining, by the at least one processor, the preset number of top ranked polygonal regions as optimal polygonal regions.

10. The method according to claim 9, wherein ranking the plurality of polygonal regions according to the feature parameter vector of each polygonal region comprises:

calculating, by the at least one processor, a difference value between the feature parameter vectors of the two polygonal regions; and determining, by the at least one processor, a sequence of the two polygonal regions according to a mapping relationship between the difference value and a ranking function.

11. The method according to claim 10, wherein each feature parameter further corresponds to a coefficient when there are a plurality of feature parameters in the feature parameter vector.

12. The method according to claim 9, wherein the feature parameters comprise at least one of the followings:

a first feature parameter, denoting a total duty ratio of all sides of the polygonal region;

a second feature parameter, denoting a sum of ratios of a projection length of each side of the polygonal region in a main direction to an image length in the main direction;

a third feature parameter, denoting a similarity degree between interior angles of the polygonal region and interior angles of a regular polygon; or a fourth feature parameter, denoting a KL divergence between an internal gray and an external gray of the polygonal region.

13. A non-transitory computer readable storage medium storing a computer program, wherein when the computer program is executed by a processor, the processor is configured to perform:

obtaining a to-be-detected image;

calculating line segments in the image based on a line detection algorithm;

merging a plurality of line segments meeting a merging condition into a merged line segment;

determining crosspoints of the pairwise merged line segments according to the merged line segment; and generating a polygonal region with the crosspoints as vertexes of the polygonal region in the image;

wherein merging the plurality of line segments meeting the merging condition into the line segment comprises:

obtaining any two adjacent line segments;

calculating projection lengths of the two line segments on the same coordinate axis; and merging the two line segments into the line segment when both of vertical distances between two end points of the line segment with the shorter projection length and the other line segment are less than a threshold.

14. An electronic device, comprising:

a processor; and a memory configured to store an executable instruction of the processor;

wherein the processor is configured to perform:

obtaining a to-be-detected image;

calculating line segments in the image based on a line detection algorithm;

merging a plurality of line segments meeting a merging condition into a merged line segment;

determining crosspoints of pairwise merged line segments according to the merged line segments; and generating a polygonal region with the crosspoints as vertexes of the polygonal region in the image;

wherein merging the plurality of line segments meeting the merging condition into the line segment comprises:

obtaining any two adjacent line segments;

calculating projection lengths of the two line segments on the same coordinate axis; and merging the two line segments into the line segment when both of vertical distances between two end points of the line segment with the shorter projection length and the other line segment are less than a threshold.

15. The electronic device according to claim 14, wherein merging the two line segments into the line segment comprises:

obtaining two farthest end points of the two line segments; and connecting the two end points to obtain a merged line segment.

16. The electronic device according to claim 14, wherein determining the crosspoints of the pairwise merged line segments according to the merged line segments in the image comprises:

setting a direction of each merged line segment clockwise or counter clockwise with a center of the image as an origin to obtain a line segment vector;

obtaining an intersection point between every two line segment vectors; and determining the intersection point as the crosspoint when the intersection point meets a crosspoint condition.

17. The electronic device according to claim 14, wherein generating the polygonal region with the crosspoints as the vertexes of the polygonal region in the image comprises:

generating a quadrangular region with four crosspoints as the vertexes of the quadrangular region in the image when any four crosspoints meet a condition of generating the quadrangular region.

18. The electronic device according to claim 17, wherein generating the quadrangular region with the four crosspoints as the vertexes of the quadrangular region in the image when any four crosspoints meet the condition of generating the quadrangular region comprises:
- obtaining a crosspoint A with a coordinate value being greater than 0 and a crosspoint B with a coordinate value being less than 0 under the same coordinate axis with a center point of the image as an origin of coordinates;
- obtaining an intersection point C constituted by an incident line segment vector of the crosspoint A and an emergent line segment vector of the crosspoint B;
- obtaining an intersection point D constituted by an emergent line segment vector of the crosspoint A and an incident line segment vector of the crosspoint B; and
- determining the points A, B, C and D to meet the condition of generating the quadrangular region when both of the intersection points C and D meet a crosspoint condition;
- wherein the incident line segment vector is a line segment vector pointing to the crosspoint; and the emergent line segment vector is a line segment vector starting from the crosspoint.

\* \* \* \* \*